(12) United States Patent
Scheuerman et al.

(10) Patent No.: US 8,574,320 B2
(45) Date of Patent: Nov. 5, 2013

(54) PRESS APPARATUS

(75) Inventors: Robert J. Scheuerman, Washington, MI (US); Edgar M. Storm, Jr., Spencerport, NY (US); Benjamin D. Kaufman, Fairport, NY (US); Robert R. Brummond, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 731 days.

(21) Appl. No.: 12/768,788

(22) Filed: Apr. 28, 2010

(65) Prior Publication Data

US 2010/0306995 A1 Dec. 9, 2010

Related U.S. Application Data

(60) Provisional application No. 61/185,030, filed on Jun. 8, 2009.

(51) Int. Cl.
*H01M 2/00* (2006.01)
*H01M 2/36* (2006.01)

(52) U.S. Cl.
USPC .......................................... 29/623.1; 100/35

(58) Field of Classification Search
USPC ........................................................ 29/623.1
See application file for complete search history.

(56) References Cited

U.S. PATENT DOCUMENTS 7,464,641 B2 * 12/2008 Kang et al. .................... 100/219

* cited by examiner

*Primary Examiner* — Patrick Ryan
*Assistant Examiner* — Brent Thomas
(74) *Attorney, Agent, or Firm* — Fraser Clemens Martin & Miller LLC; J. Douglas Miller

(57) ABSTRACT

A press apparatus for assembly of a battery pack includes a tooling table having an aperture formed therein. The tooling table includes a plurality of index pawls disposed adjacent the aperture. The index pawls militate against the components passing upwardly through the aperture after the components have passed downwardly through the aperture. A first press is disposed on a first side of the tooling table and configured to advance the components downwardly through the aperture and past the index pawls on the tooling table. A second press is disposed on a second side of the tooling table. The second press is configured to retract a distance that the components are pressed downwardly through the aperture and maintain a substantially constant upward force on the components. A third press is disposed on the first side of the tooling table and configured to compress the battery pack to a desired size and load.

5 Claims, 7 Drawing Sheets

PRESS APPARATUS

CROSS-REFERENCE TO RELATED APPLICATIONS

This application claims the benefit of U.S. Provisional Application No. 61/185,030, filed on Jun. 8, 2009. The entire disclosure of the above application is hereby incorporated herein by reference.

FIELD OF THE INVENTION

The present disclosure relates to battery pack assembly and more particularly to a press apparatus for assembly of a battery pack.

BACKGROUND OF THE INVENTION

A battery cell has been proposed as a clean, efficient and environmentally responsible power source for electric vehicles and various other applications. One type of battery cell is known as the lithium-ion battery. The lithium-ion battery is rechargeable and can be assembled in a wide variety of shapes and sizes so as to efficiently fill available space in electric vehicles. A plurality of individual lithium-ion battery cells can be provided in a battery pack to provide an amount of power sufficient to operate electric vehicles.

It is known that, when the battery cells and related stack components such as cooling fins, foam, and frames are stacked loosely during assembly of the battery pack, a compression gradient over a height of the battery pack may occur that undesirably affects a dimensional quality of the assembly. In particular, the loosely stacked battery cells may undesirably splay, flare, or arch to form a "banana" shape. The splaying of the battery pack may result from the presence of seals on the stack components. The splayed battery pack does not always straighten out sufficiently when the battery pack is subsequently compressed with a compression retention system.

There is a continuing need for a tooling solution to stack battery cells and related stack components while maintaining a dimensional quality of the resultant battery pack.

SUMMARY OF THE INVENTION

In concordance with the instant disclosure, a tooling solution to stack battery cells and related stack components, while maintaining a dimensional quality of the resultant battery pack, is surprisingly discovered.

The invention of the present disclosure addresses a non-uniform compression gradient that may otherwise form during assembly of a battery pack. The non-uniform compression gradient is addressed by applying a "pre-compression" of the assembly throughout the battery pack assembly process. The battery pack assembly is compressed continuously as components of the battery pack assembly are added to the battery pack assembly.

In one embodiment, a press apparatus for assembly of a battery pack includes a tooling table having an aperture formed therein. The tooling table includes a plurality of index pawls disposed adjacent the aperture that allow components of the battery pack to be advanced downwardly through the aperture and form a stack of the components. The index pawls militate against the components passing upwardly through the aperture after the components have passed downwardly through the aperture. A first press is disposed on a first side of the tooling table and configured to advance the components downwardly through the aperture and past the index pawls on the tooling table. A second press is disposed on a second side of the tooling table. The second press is configured to retract a distance that the components are pressed downwardly through the aperture and maintain a substantially constant upward force on the components and the index pawls after the components have been advanced downwardly through the aperture. A third press is disposed on the first side of the tooling table and configured to compress the battery pack to a desired size and load after a desired quantity of the components have been advanced downwardly through the aperture of the tooling table.

In another embodiment, a method for assembly of a battery pack includes the steps of: providing the press apparatus; loading the components atop the tooling table; causing the first press to advance the components through the aperture in the tooling table, the second press retracting the distance of the components advanced through the aperture and maintaining a substantially constant upward force on the components and the index pawls; repeating the loading of the components and the advancing of the components through the aperture until the desired quantity of components is present in the stack; and causing the third press to compress the stack to the desired size and load. The battery pack is thereby provided.

In a further embodiment, each the index pawls of the press apparatus includes a spring-loaded clamp finger configured to move laterally outwardly as the components of the battery pack are pressed downwardly through the aperture, and move laterally inwardly after the components have passed downwardly through the aperture. The tooling table further includes a plurality of datum rods disposed adjacent the aperture and configured to guide the components of the battery pack as they are pressed downwardly through the aperture and hold the components in the stack. A pusher is disposed adjacent the aperture and opposite the datum rods. The pusher is configured to maintain a positive pressure on the datum rods by pressing against the components of the battery pack during the assembly of the battery pack. The press apparatus also includes a pair of spaced apart support members, an upper bridge spanning the support members adjacent one end of the support members, and a lower bridge spanning the support members adjacent an other end of the support members. The tooling table is disposed between the support members between the upper bridge and the lower bridge. The first press is disposed atop the upper bridge, the second press is disposed atop the lower bridge, and the third press appends from the upper bridge.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
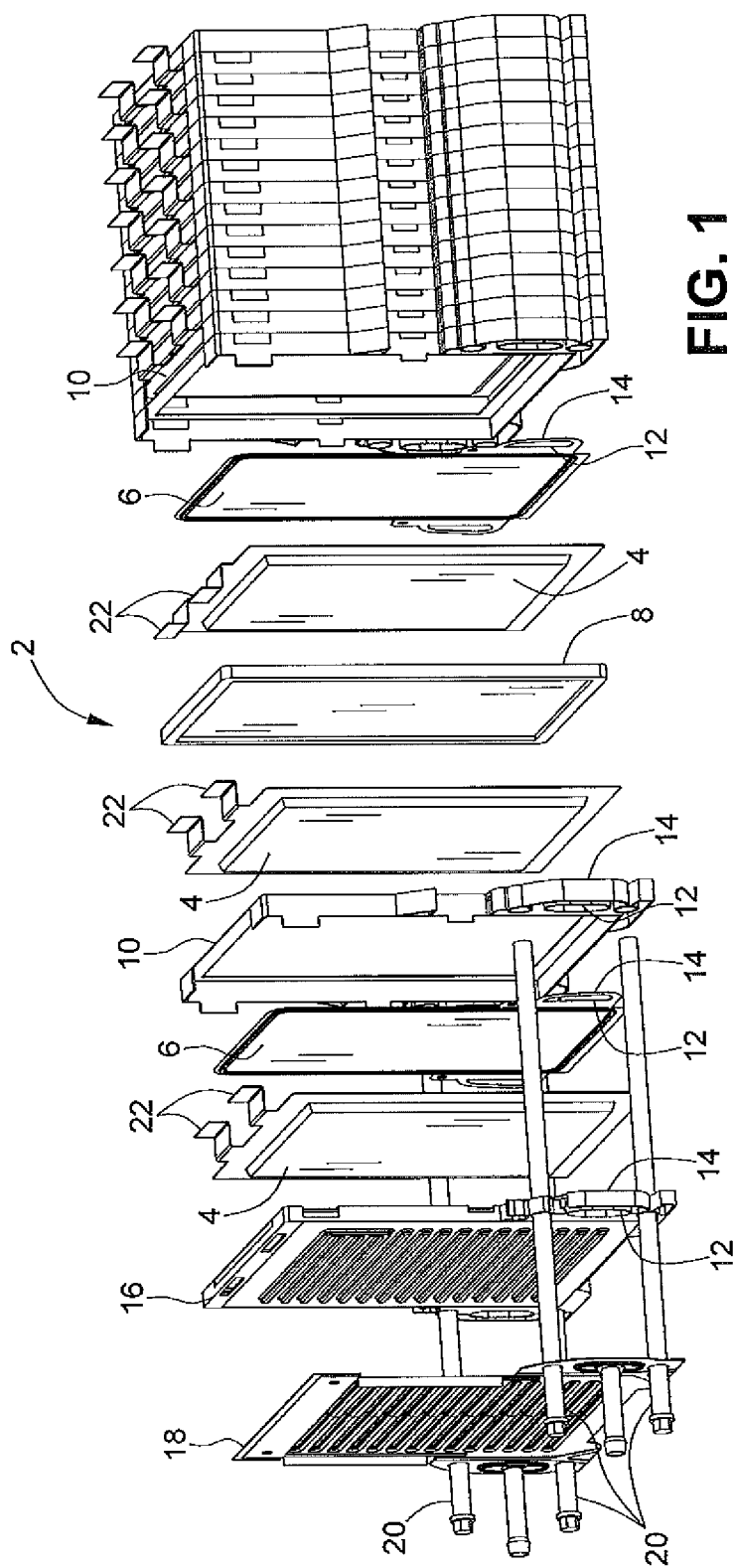
FIG. 1 is an exploded fragmentary side perspective view of an exemplary battery cell stack assembled with a press apparatus according to the present disclosure.
Figure 2:
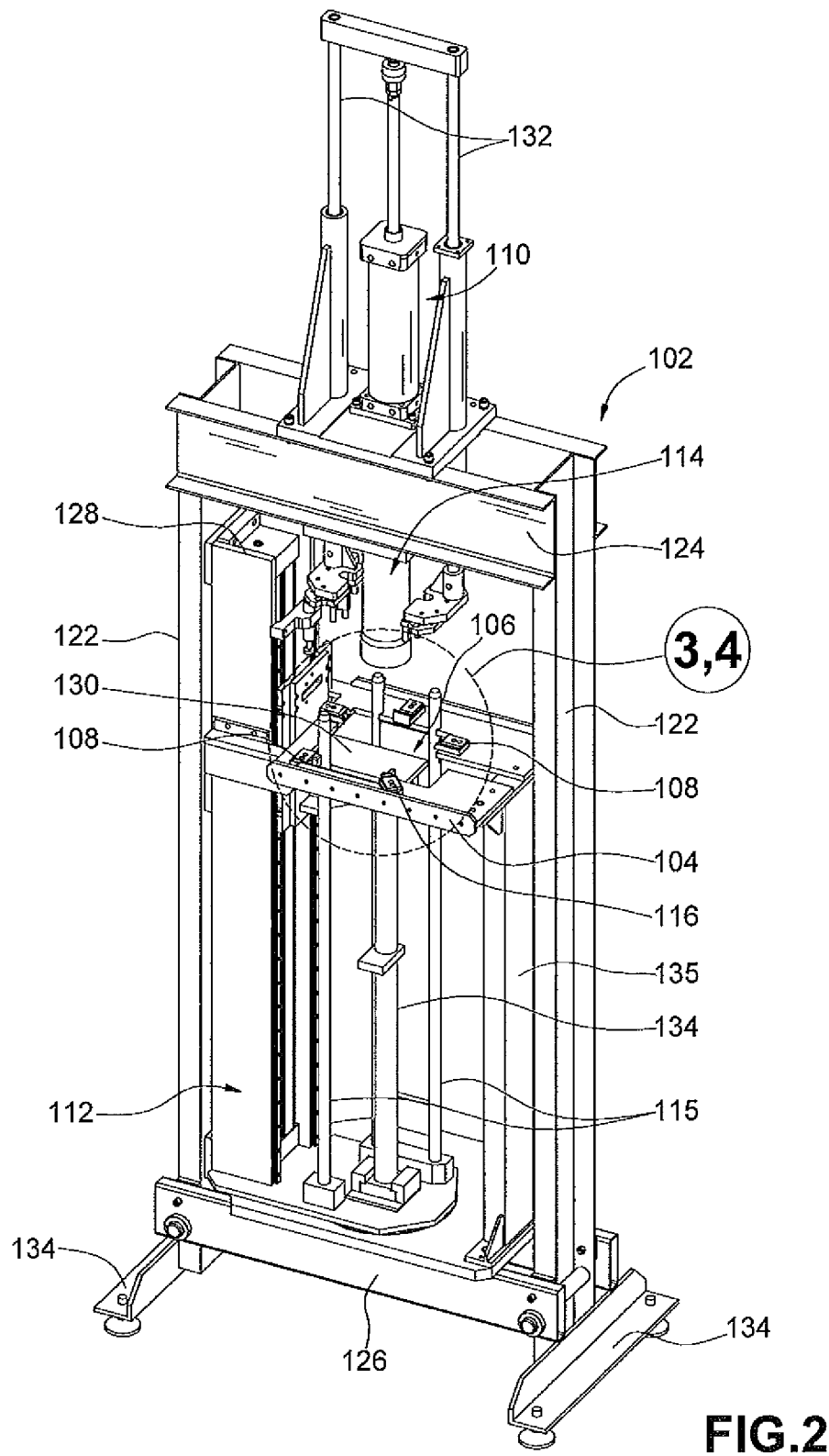
FIG. 2 is a front perspective view of a press apparatus according to the present disclosure.

As shown in FIG. 1, an exemplary battery pack 2 is shown for use with the system and method of the present invention. The battery pack 2 includes a plurality of battery cells 4 disposed in a stack. A plurality of cooling plates 6 may also be disposed in a stack in heat transfer communication with the battery cells 4. For example, each one of the plurality of battery cells 4 may be in contact with one of the cooling plates 6 under compression.

The battery pack 2 further includes compliant or deformable spacers 8 disposed between individual ones of the battery cells 6 in the battery pack assembly 2. The spacers 8 may be conductive or nonconductive, as desired. As an illustrative example, the spacers 8 are formed from a nonconductive foam that deforms with compression of the battery pack 2. The spacers 8 militate against an undesirable movement of the battery cells 4 during operation of the battery pack 2. Other compliant or deformable materials may also be employed for the spacers 8, as desired.

The battery cells 4, the cooling plates 6, and the spacers 8 may be disposed within repeating frame assemblies 10. Each of the repeating frame assemblies 10 may be a nonconductive frame formed from plastic or rubber, for example. One of the cooling plates 6, one of the repeating frame assemblies 10, a pair of the battery cells 4, and one of the spacers 8 may form a repeating unit of the battery pack 2. The repeating frame assemblies 10 are configured to securely hold and align the battery cells 4, the cooling plates 6, and the spacers 8 in the stack to form the battery pack 2.

It should be understood that each of the cooling plates 6 and each of the repeating frame assemblies 10 may have manifold apertures 12 that together cooperate to form manifolds for bulk transport of coolant fluid to and from the cooling plates 6 within the battery pack 2. As a nonlimiting example, the manifold apertures 12 may be formed in outwardly extending ears 14 disposed on opposing sides of the coolant plates 6 and the repeating frame assemblies 10. The repeating frame assemblies 10 may include seals such as press-in-place seals that surround the manifold apertures 12. The seals may protrude from the repeating frame assemblies 10 on each side of the repeating frame assemblies 10, for example, up to about 1.0 mm. Other bulk transport systems for the coolant fluid to and from the cooling plates 6 may also be employed, as desired.

The battery pack 2 may further include module end frames 16 and section end assemblies 18 disposed at ends of the stack of the battery cells 4. The module end frames 16 and the section end assemblies 18 may cooperate with compression rods 20 to hold the battery cells 4 and the cooling plates 6 under compression. Section retention loops (not shown) disposed around the stack and section covers (not shown) disposed on sides of the stack may also be employed to hold the battery pack 2 together. Electrical tabs 22 in electrical communication with the battery cells 4 are also present for connecting the battery cells 4, for example, in parallel with an interconnect board (not shown). The battery pack 2 suitable for powering an electric vehicle may thereby be provided.

A press apparatus 102 for assembly of the battery pack 2 is illustrated in FIGS. 2-7. The press apparatus 102 includes a tooling table 104 having an aperture 106 formed therein. The tooling table 104 includes a plurality of index pawls 108 disposed adjacent the aperture 106. The index pawls 108 allow components of the battery pack 2 such as at least one of the battery cells 4, the cooling plates 6, the spacers 8, and the repeating frame assemblies 10 to be advanced or indexed downwardly through the aperture 106 and form a stack of the components. The index pawls 108 militate against the components passing upwardly through the aperture 106 after the components have passed downwardly through the aperture 106.

The press apparatus 102 includes a first press 110, a second press 112, and a third press 114. The first press 110 is disposed on a first side of the tooling table 104. The first press 110 is configured to advance the components downwardly through the aperture 106 and past the index pawls 108 on the tooling table 104. The first press 110 is also configured to overpower the second press 112 when the components are advanced through the aperture 106 by the first press 110.

The second press 112 is disposed on a second side of the tooling table 104. The second press 112 is configured to retract a distance that the components are pressed downwardly through the aperture 106. The second press 112 maintains a substantially constant upward force on the components and the index pawls 108 after the components have been advanced downwardly through the aperture 106.

The third press 114 is disposed on the first side of the tooling table 104. The third press 114 is configured to compress the battery pack 2 to a desired size and load after a desired quantity of the components have been advanced downwardly through the aperture 106 of the tooling table 104.

As shown in FIGS. 2-7, the press apparatus 102 further includes a plurality of datum rods 115. The datum rods 115 are disposed adjacent the aperture 106 of the tooling table 104. The datum rods 115 are configured to guide the components of the battery pack 2 as they are pressed downwardly through the aperture 106. The datum rods 115 also securely hold and align the components in the stack forming the battery pack 2.

The press apparatus 102 may also include a datum clamp or pusher 116 that provides a force to keep the components in contact with the datum rods 115. The pusher 116 may be disposed adjacent the aperture 106 on the tooling plate 104, opposite the datum rods 115. The pusher 116 may have a substantially V-shaped end that cooperates with a corner of the components disposed in the stack. In particular, the pusher 116 is configured to maintain a positive pressure on the datum rods 115 through the components of the battery pack 2 during the assembly of the battery pack 2. The positive pressure provided by the pusher 116 is low enough to permit the components to slide into the stack when the components are pressed downwardly through the aperture 106 of the tooling table 104.

Figure 3:
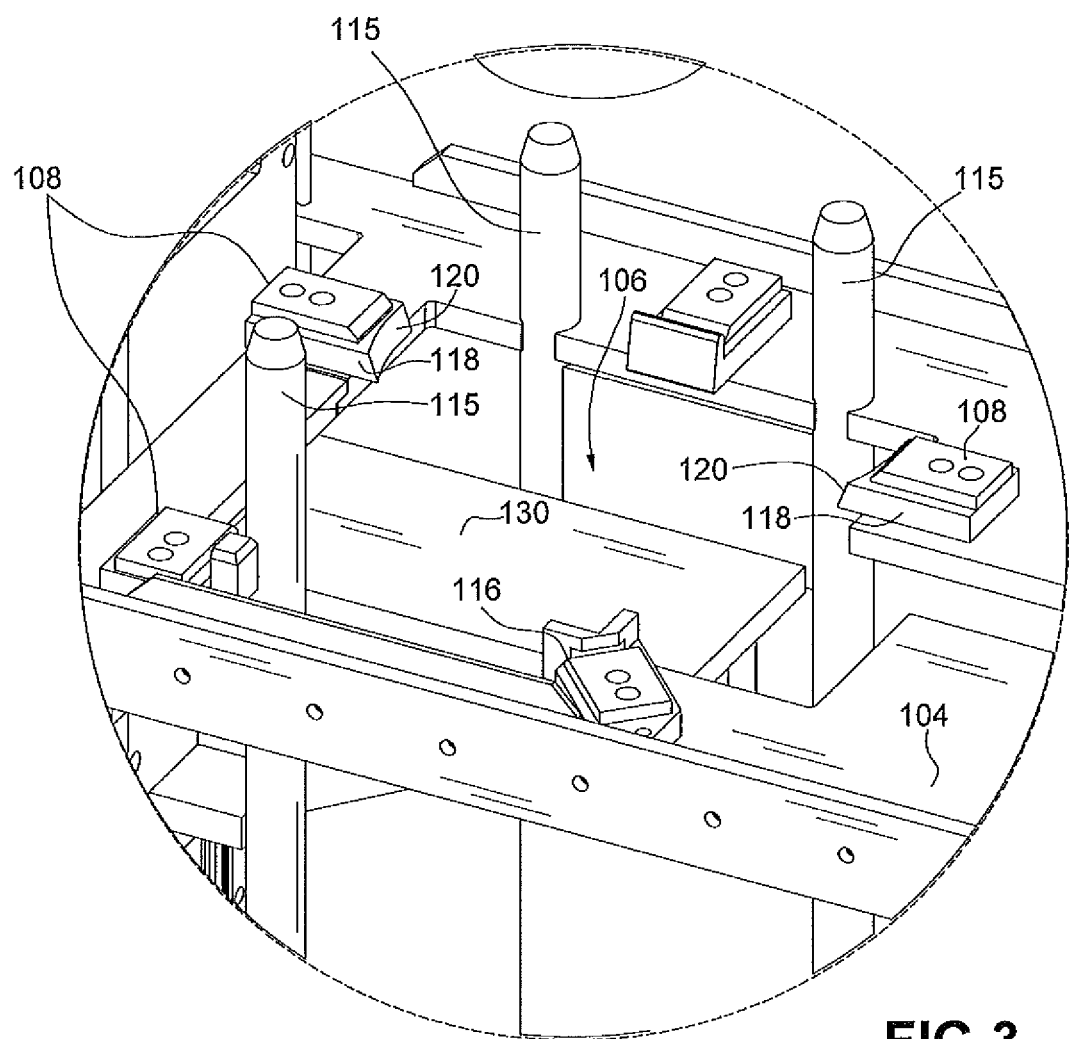
FIG. 3 is an enlarged fragmentary front perspective view of the press apparatus taken within circle 3 of FIG. 2.
Figure 4:
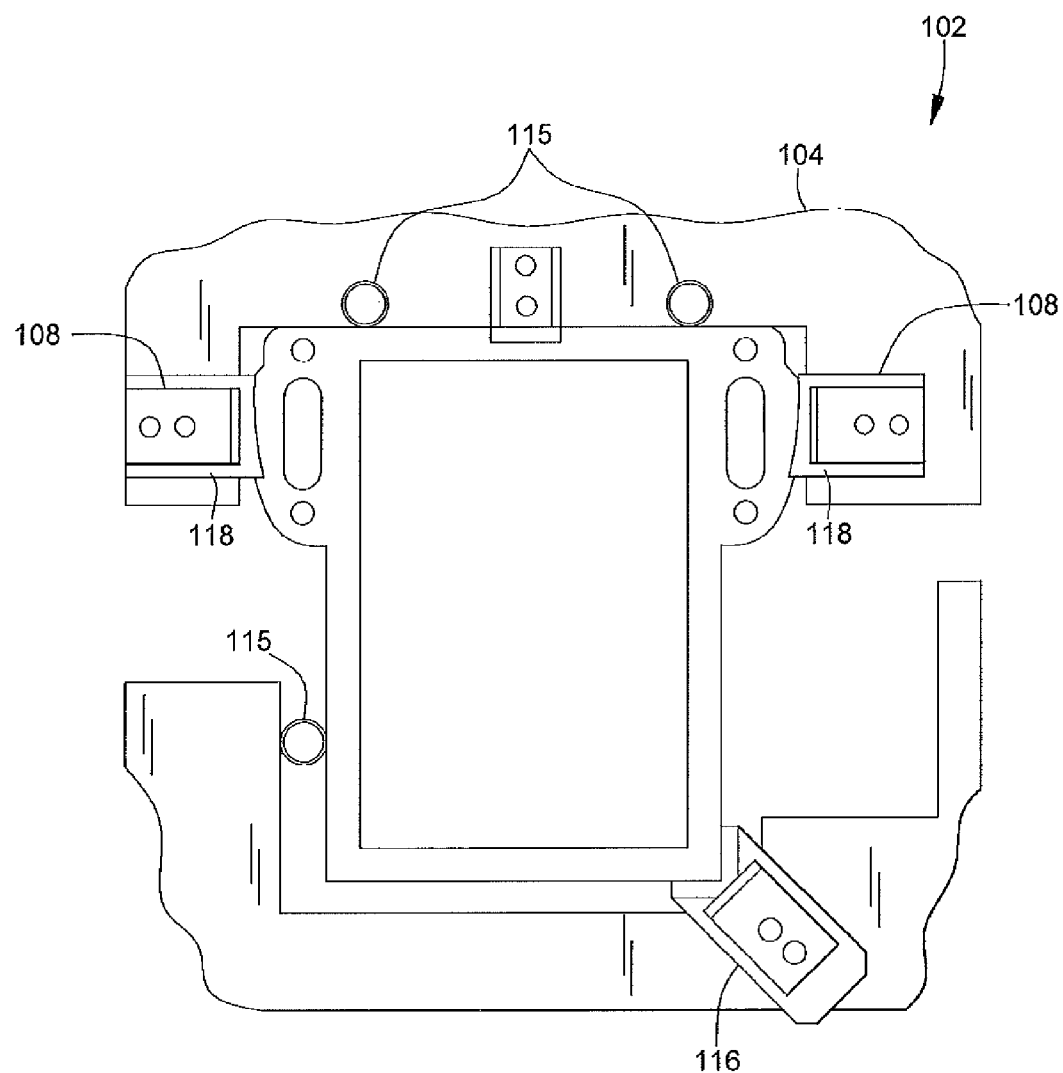
FIG. 4 is an enlarged fragmentary top plan view of the press apparatus taken within circle 4 of FIG. 2, further showing a component of a battery pack in a tooling plate.

As shown in FIGS. 3 and 4, each of the index pawls 108 of the press apparatus 102 includes a spring-loaded clamp finger 118. The clamp finger 118 is configured to move laterally outwardly as the components of the battery pack 2 are pressed downwardly through the aperture 106. For example, each of the clamp fingers 118 may have a sloped or beveled edged 120 that permits the components of the battery pack 2 to move the clamp fingers 118 laterally outwardly as the components slide by and are pushed through the aperture 106. The clamp finger 118 is also configured to move laterally inwardly, under a biasing force from a spring (not shown), after the components have passed downwardly through the aperture 106.

With reference to FIGS. 2 and 5-7, the press apparatus 102 may include a pair of spaced apart support members 122. An upper bridge 124 spans the support members 122 adjacent one end of the support members 122. A lower bridge 126 spans the support members 122 adjacent an other end of the support members 122. The tooling table 104 is disposed between the support members 122. The tooling table 104 is also disposed between the upper bridge 124 and the lower bridge 126. The first press 110 is disposed atop the upper bridge 124, the second press 112 is disposed atop the lower bridge 126, and the third press 114 is disposed below and depends from the upper bridge 124.

In one embodiment, the second press 112 is disposed adjacent one of the support members 122. The second press 112 may be disposed between the one of the support members 122 and the tooling table 104. For example, the second press 112 may be partially enclosed by a pair of walls 128 extending outwardly from the one of the support members 122 toward the other of the support members 122. The second press 112 also has a support table 130 attached thereto, atop which the components of the battery pack 2 rest after being advanced through the aperture 106 in the tooling table 104. The support table 130 is movable by the second press 112 between the lower bridge 126 and the tooling table 104.

In certain embodiments, the first press 110 may include a pair of press arms 132 disposed on opposing sides of the third press 114. The press arms 132 are configured to apply a downward force to the components of the battery pack 2 in order to advance the components downwardly through the aperture 106 of the tooling table 104. The press arms 132 may include fingers at the ends thereof that cooperate with the components during the application of the downward force.

The press apparatus 102 of the present disclosure may also have a floor support 134 coupled to each of the support members 122. The floor supports 134 are configured to hold the support members 122 in a substantially upright position atop a floor or other support surface during the assembly of the battery pack 2.

In the embodiment illustrated in FIGS. 2 and 5-7, the tooling table 104 is supported by a support post 136 and the walls 128 of the second press 112. A skilled artisan should understand that the tooling table 104 in alternative embodiments may be supported by other means, for example, by at least one of the support members 122, as desired.

It should be appreciated that the first press 110, the second press 112, and the third press 114 may include one of a pneumatic motor, a hydraulic motor, and an electric motor, as desired. In a particular embodiment, the first press 110 includes a pneumatic motor with an air cylinder, the second press 112 includes a pneumatic motor with a rod-less air cylinder, and the third press 114 includes a hydraulic motor with a hydraulic cylinder. Other suitable motors for actuation of the first press 110, the second press 112, and the third press 114 may also be employed within the scope of the present disclosure.

The press apparatus 102 may further include a telescoping guiding cylinder 138 that cooperates with the second press 112 to buttress the components of the battery pack 2 as they are advanced through the aperture 106 in the tooling plate 104. In certain embodiments, the guiding cylinder 138 may include a force damping means and may be used particularly where the second press 112 includes the rod-less air cylinder. The telescoping guiding cylinder 138 may also be locked in place, for example, by insertion of a locking rod after a desired quantity of components is present in the stack, in order that the third press 114 may be actuated and cause the stack to be compressed to the desired height and load.

Figure 5:
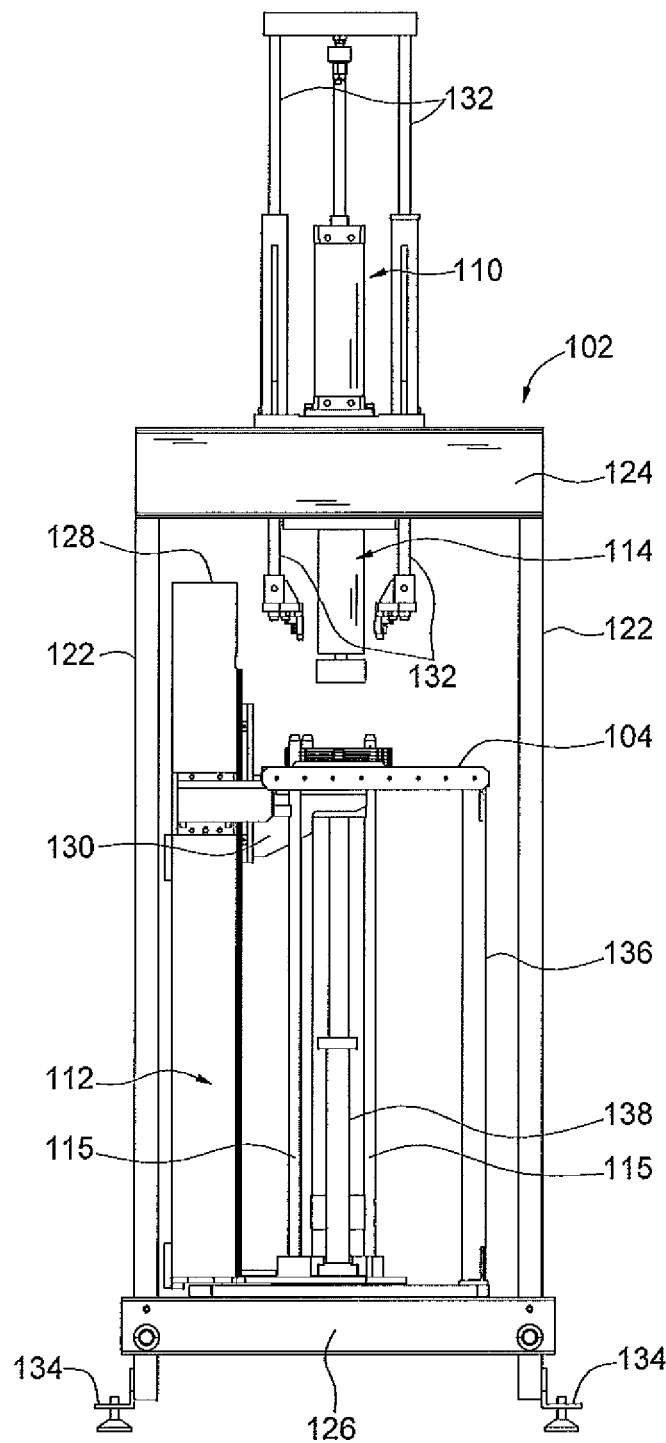
FIG. 5 is a front elevational view of the press apparatus shown in FIG. 2, further showing the press apparatus at the beginning of a press cycle.
Figure 6:
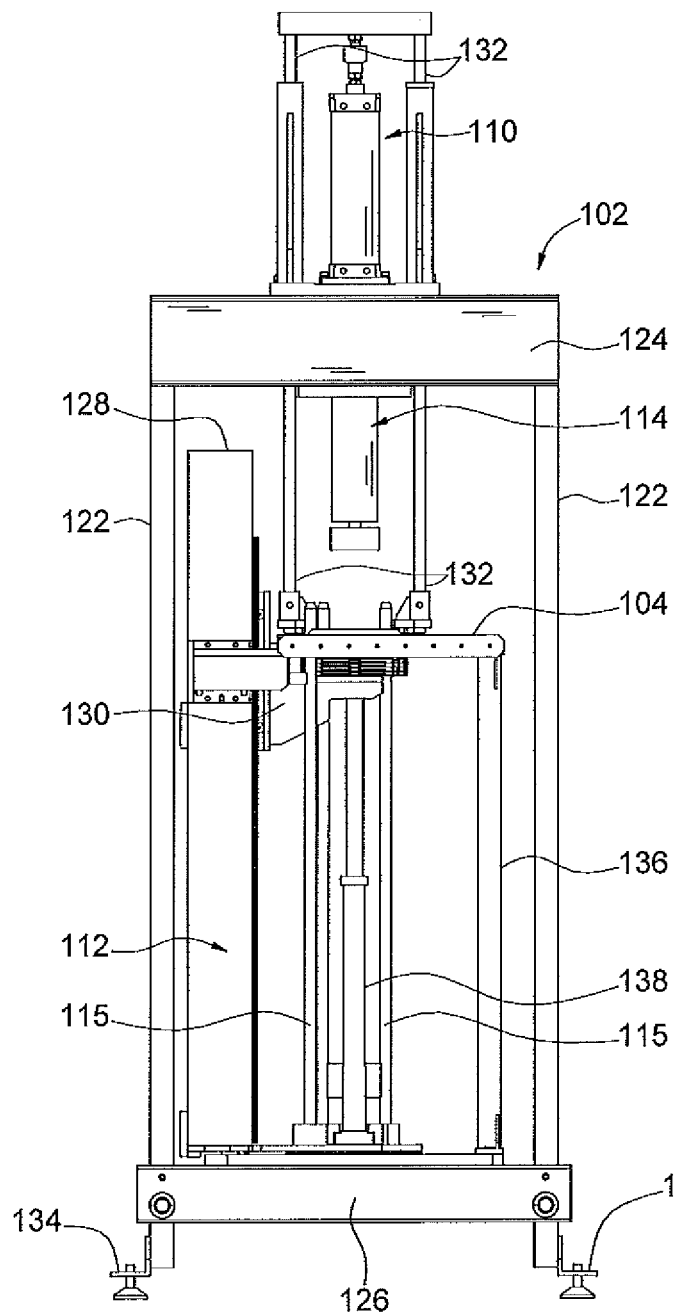
FIG. 6 is a front elevational view of the press apparatus shown in FIG. 2, further showing the press apparatus advancing components of a battery pack through a tooling plate.
Figure 7:
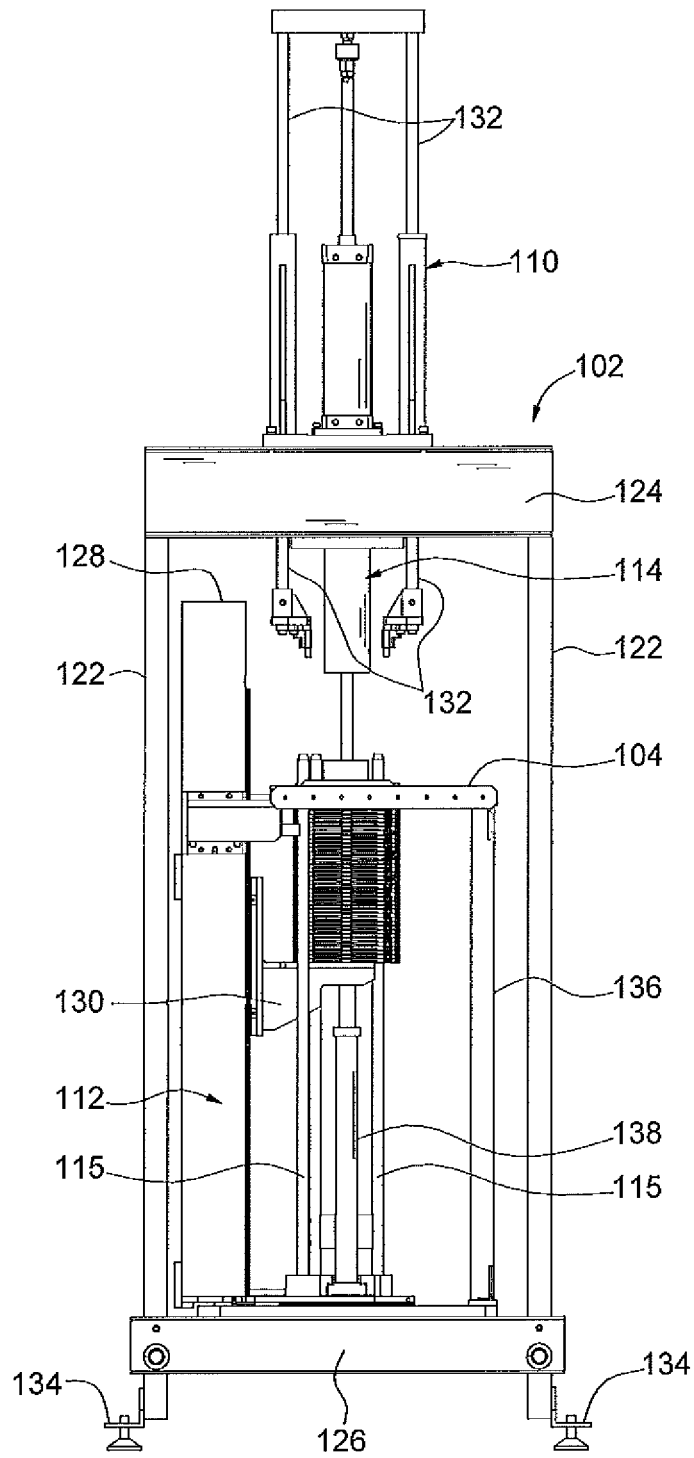
FIG. 7 is a front elevational view of the press apparatus shown in FIG. 2, further showing the press apparatus compressing a battery pack after a desired quantity of components has been stacked with the press apparatus.

The present disclosure also includes a method for assembly of the battery pack 2, for example, as illustrated in FIGS. 5-7. The method comprising the steps of providing the press apparatus 2 as described hereinabove. The components of the battery pack 2 such as the battery cells 4, the cooling plates 6, the spacers 8, and the repeating frame assemblies are then loaded atop the tooling table 104. As shown in FIG. 5, the components may be provided as a "mini-stack" including one or more repeating units of the battery pack 2. The first press 110 is then caused to advance the components through the aperture 106 in the tooling table 104, for example, as illustrated in FIG. 6. The second press 112 retracts the distance of the components that have been advanced through the aperture 106. The second press 112 also maintains a substantially constant upward force on the components and the index pawls 108. The first press 110 is retracted after the components are advanced thought the aperture 106 in the tooling table 104 so that additional components may be loaded atop the tooling table 104 for inclusion in the stack.

The steps of loading the components and advancing the components through the aperture 106 are then repeated until the desired quantity of components is present in the stack. As nonlimiting examples, the stack may include between about seventy-two (72) and one hundred and twenty-eight (128) battery cells 4. One of ordinary skill in the art may select other desired quantities of components in the stack, as desired.

After the desired quantity of components is present in the stack, the first press 110 is retracted and the third press 114 is caused to compress the stack to the desired size and load, as shown in FIG. 7. The second press 112 may be locked in place prior to the actuation of the third press 114, in order to militate against downward movement of an entirety of the stack 2 as the third press 114 compressed the stack. The stack is clamped after it has been compressed to the desired size and load by the third press 114, for example, through installation of a plurality of the compression rods 20, and torquing the compression rods 20 to provide the desired load on the stack. The third press 114 is then retracted, and the battery pack 2 is thereby provided.

Advantageously, the press apparatus 102 and method of the present disclosure provides the ability to maintain positive pressure on the datum rods 115 during the stacking process, while allowing the components of the battery pack 2 to "slide" into position. Moreover, the press apparatus 102 provides a substantially constant nominal compression force during stacking of the components of the battery pack 2, thereby negating the splaying or flaring effect observed during state-of-the-art battery cell stacking processes. The press apparatus 102 further permits an application of an increased force and final load without undesirably affecting stack alignment and dimensions.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for assembly of a battery pack, the method comprising the steps of:

providing a press apparatus including a tooling table having an aperture formed therein, the tooling table including a plurality of index pawls disposed adjacent the aperture that allow components of the battery pack to be advanced downwardly through the aperture and form a stack of the components, the index pawls militate against the components passing upwardly through the aperture after the components have passed downwardly through the aperture, a first press disposed on a first side of the tooling table to advance the components downwardly through the aperture and past the index pawls on the tooling table, a second press disposed on a second side of the tooling table, the second press configured to retract a distance that the components are pressed downwardly through the aperture and maintain a substantially constant upward force on the components and the index pawls after the components have been advanced downwardly through the aperture, and a third press disposed on the first side of the tooling table and configured to compress the battery pack to a desired size and load after a desired quantity of the components have been advanced downwardly through the aperture of the tooling table;

loading the components atop the tooling table;

causing the first press to advance the components through the aperture in the tooling table, the second press retracting the distance of the components advanced through the aperture and maintaining a substantially constant upward force on the components and the index pawls;

repeating the loading of the components and the advancing of the components through the aperture until the desired quantity of components is present in the stack; and causing the third press to compress the stack to the desired size and load, and thereby provide the battery pack.

2. The method of claim 1, wherein the first press is retracted after the components are advanced thought the aperture in the tooling table so that one of additional components may be loaded atop the tooling table and the third press may compress the stack to the desired size and load.

3. The method of claim 1, further including the step of clamping the stack after it has been compressed to the desired size and load by the third press.

4. The method of claim 3, wherein the step of clamping the stack includes installing a plurality of compression rods in the stack and torquing the compression rods to the desired load before retracting the third press.

5. The method of claim 1, wherein the second press is locked in place prior to the step of causing the third press to compress the stack to the desired size and load.

* * * * *